(12) United States Patent
He et al.

(10) Patent No.: US 12,538,354 B2
(45) Date of Patent: Jan. 27, 2026

(54) ENHANCED CHANNEL ACCESS MECHANISMS IN SHARED RADIO WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Jie Cui, San Jose, CA (US); Oghenekome Oteri, San Diego, CA (US); Wei Zeng, Saratoga, CA (US); Wei Zhang, Santa Clara, CA (US); Weidong Yang, San Diego, CA (US); Yang Tang, San Jose, CA (US); Yuchul Kim, San Jose, CA (US); Yuqin Chen, Beijing (CN); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 527 days.

(21) Appl. No.: 17/995,643

(22) PCT Filed: Apr. 8, 2020

(86) PCT No.: PCT/CN2020/083778
§ 371 (c)(1),
(2) Date: Oct. 6, 2022

(87) PCT Pub. No.: WO2021/203304
PCT Pub. Date: Oct. 14, 2021

(65) Prior Publication Data
US 2023/0209595 A1 Jun. 29, 2023

(51) Int. Cl.
*H04W 74/0808* (2024.01)
*H04W 16/14* (2009.01)
(Continued)

(52) U.S. Cl.
CPC ....... *H04W 74/0808* (2013.01); *H04W 16/14* (2013.01); *H04W 72/542* (2023.01); *H04W 72/232* (2023.01)

(58) Field of Classification Search
None
See application file for complete search history.

(56) References Cited

U.S. PATENT DOCUMENTS 10,581,571 B2   3/2020  Kim et al.
2016/0338118 A1* 11/2016 Vajapeyam ......... H04B 17/318
(Continued)

FOREIGN PATENT DOCUMENTS

CN   107852666 A    3/2018
CN   109076601      12/2018
(Continued)

OTHER PUBLICATIONS

ETSI MCC, "Report of 3GPP TSG RAN WG2 meeting #94", 3GPP TSG-RAN Working Group 2 meeting #95, R2-164670, May 27, 2016, 217 sheets.

*Primary Examiner* — Scott M Sciacca
(74) *Attorney, Agent, or Firm* — Fay Kaplun & Marcin, LLP

(57) ABSTRACT

A next generation evolved Node B (gNB) configured to provide an unlicensed bandwidth for communications with a user equipment (UE) performs a listen-before-talk procedure to determine an occupation state of busy or idle for the unlicensed bandwidth. When the occupation state is determined by the gNB to be idle, the gNB signals the UE, via a downlink control indicator (DCI), to conduct a channel access measurement (CAM) on the unlicensed bandwidth, the measurement comprising at least one of an energy detection measurement or a signal quality measurement. A measurement report is received from the UE comprising an indication of the occupation state of the unlicensed bandwidth as determined by the UE.

18 Claims, 7 Drawing Sheets

(51) Int. Cl.
*H04W 72/542* (2023.01)
*H04W 72/232* (2023.01)

(56) References Cited

U.S. PATENT DOCUMENTS

| | | | |
|---|---|---|---|
| 2017/0230992 A1* | 8/2017 | Patel | H04W 72/1268 |
| 2017/0230994 A1* | 8/2017 | You | H04L 5/0053 |
| 2018/0227828 A1 | 8/2018 | Sirotkin et al. | |
| 2018/0302889 A1 | 10/2018 | Guo et al. | |
| 2018/0343670 A1* | 11/2018 | Park | H04W 16/14 |
| 2019/0110307 A1 | 4/2019 | Kim et al. | |
| 2019/0182675 A1 | 6/2019 | Pu et al. | |
| 2019/0223108 A1* | 7/2019 | Wang | H04W 52/146 |
| 2019/0313271 A1 | 10/2019 | Yiu | |
| 2022/0094497 A1* | 3/2022 | Shibaike | H04L 1/0027 |

FOREIGN PATENT DOCUMENTS

| | | |
|---|---|---|
| CN | 109565697 | 4/2019 |
| CN | 109922526 A | 6/2019 |
| CN | 110637496 A | 12/2019 |
| EP | 3506709 | 7/2019 |
| WO | 2015/174437 | 4/2017 |
| WO | 2017/171325 A1 | 10/2017 |
| WO | 2017/171913 | 10/2017 |

* cited by examiner

ENHANCED CHANNEL ACCESS MECHANISMS IN SHARED RADIO WIRELESS COMMUNICATION

BACKGROUND INFORMATION

A user equipment (UE) may be configured with a variety of different capabilities. For example, the UE may be capable of establishing a connection with a network. In one example, the UE may connect to a 5G New Radio (NR) network. While connected to the 5G NR network, the UE may utilize capabilities associated with the network. In the 5G-NR standards, NR-U relates to the management of the unlicensed spectrum. Similar to Licensed Assisted Access (LAA) in the LTE standards, NR-U provides a modification to the carrier aggregation (CA) functionality that allows unlicensed bandwidths to be used for a secondary component carrier (SCC). NR-U may also be utilized in a stand-alone configuration, where a single cell provides an unlicensed bandwidth for data transmissions.

Unlicensed bandwidths may be used by network cells on an ad-hoc basis, e.g., if the bandwidth is determined to be available the resource may be used. However, the use of unlicensed bandwidths on an ad-hoc basis by the various network cells in a multi-cell NR-U configuration may cause issues when an unlicensed band is determined by a first cell to be available for use by a first UE, but the first UE senses the channel to be busy because a second cell within range of the UE is transmitting on the unlicensed band to at least a second UE.

SUMMARY

In some exemplary embodiments, a computer readable storage medium comprises a set of instructions that when executed by a processor of a next generation Node B (gNB) configured to provide an unlicensed bandwidth for communications with a user equipment (UE), cause the processor to perform operations. The operations include performing a listen-before-talk procedure to determine an occupation state of busy or idle for the unlicensed bandwidth. The operations further comprise, when the occupation state is determined by the gNB to be idle, signaling the UE, via a downlink control indicator (DCI), to conduct a channel access measurement (CAM) on the unlicensed bandwidth, the measurement comprising at least one of an energy detection measurement or a signal quality measurement. The operations further comprise receiving, from the UE, a measurement report comprising an indication of the occupation state of the unlicensed bandwidth as determined by the UE.

In further exemplary embodiments, a computer readable storage medium comprises a set of instructions that when executed by a processor of a user equipment (UE) in communication with a next generation evolved Node B (gNB) configured to provide an unlicensed bandwidth for communications with the UE cause the processor to perform operations. The operations include receiving a signal from the gNB, via a downlink control indicator (DCI), to conduct a channel access measurement (CAM) on the unlicensed bandwidth, the measurement comprising at least one of an energy detection measurement or a signal quality measurement. The operations further comprise conducting the measurement on the unlicensed bandwidth and transmitting, to the gNB, a measurement report comprising an indication of the occupation state of the unlicensed bandwidth as determined by the UE.

In still further exemplary embodiments, a computer readable storage medium comprises a set of instructions that when executed by a processor of a next generation Node B (gNB) configured to provide an unlicensed bandwidth for communications with a user equipment (UE) cause the processor to perform operations. The operations include signaling the UE, via a first downlink control indicator (DCI), to conduct a channel access measurement (CAM) on the unlicensed bandwidth, the measurement comprising at least one of an energy detection measurement or a signal quality measurement. The operations further comprise receiving, from the UE, a measurement report based on the measurement on the unlicensed bandwidth signaled by the first DCI, the measurement report comprising an indication of an occupation state of idle or busy for the unlicensed bandwidth as determined by the UE. The operations further comprise signaling the UE, via a second DCI, to transmit on a PUSCH when the measurement report indicates the occupation state of idle.

In a still further exemplary embodiment, a computer readable storage medium comprises a set of instructions, wherein the set of instructions when executed by a processor cause the processor to perform operations comprising, at a user equipment (UE) in communication with a next generation evolved Node B (gNB) configured to provide an unlicensed bandwidth for communications with the user equipment (UE), receiving a first signal from the gNB, via a first downlink control indicator (DCI), to conduct a channel access measurement (CAM) on the unlicensed bandwidth, the measurement comprising at least one of an energy detection measurement or a signal quality measurement. The operations further comprise conducting the measurement on the unlicensed bandwidth, transmitting, to the gNB, a measurement report comprising an indication of the occupation state of the unlicensed bandwidth as determined by the UE, and receiving a second signal from the gNB, via a second DCI, to transmit on a PUSCH.

DETAILED DESCRIPTION

Figure 1:
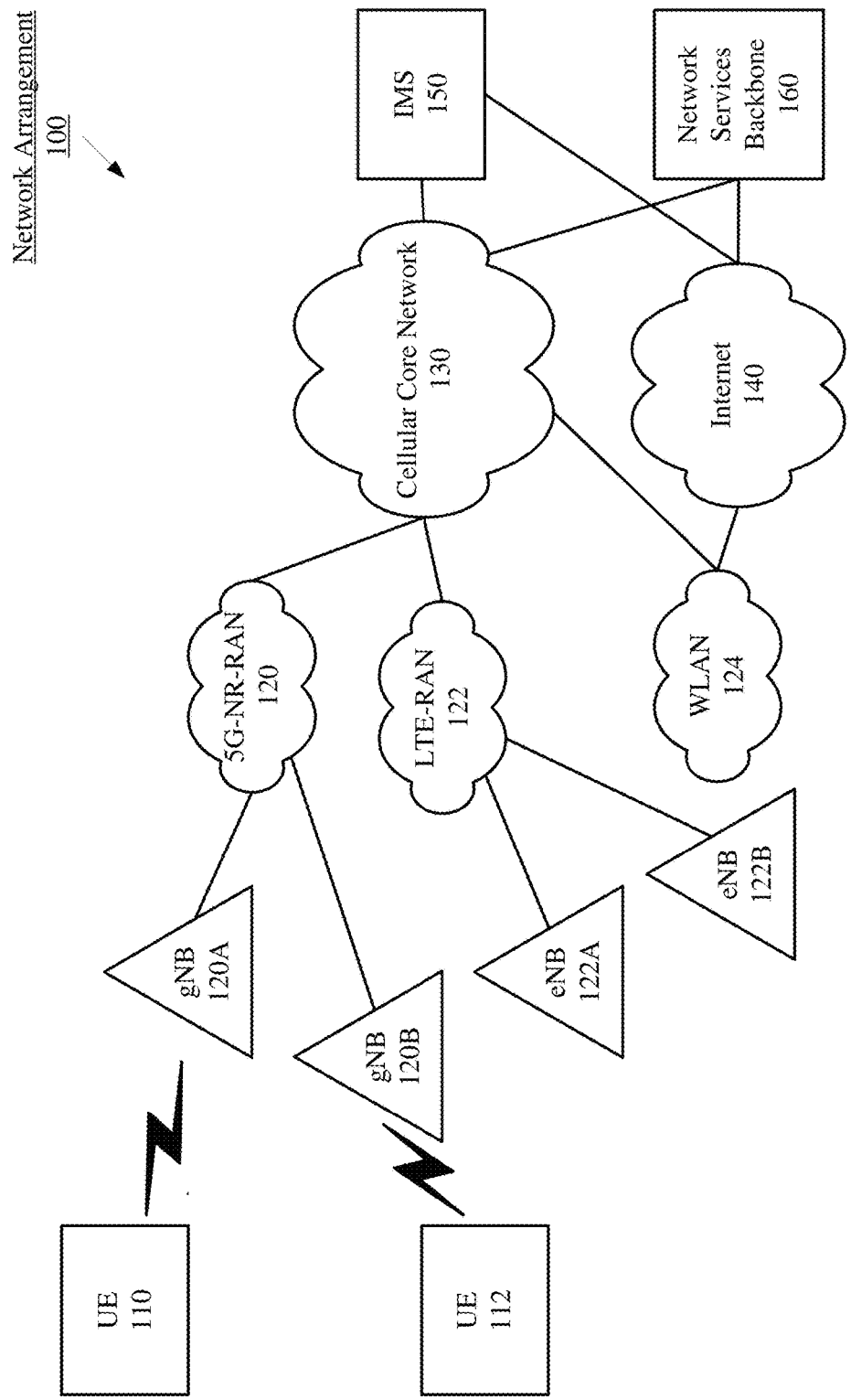
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe mechanisms for managing unlicensed frequency bands for NR-U functionality in a 5G New Radio (NR) network. Although the exemplary embodiments will be described with regard to the 5G NR network, those skilled in the art will understand the exemplary embodiments may be modified and/or used with any network that supports a functionality that utilizes bandwidths outside a designated or licensed spectrum. For example, a legacy network such as LTE supports CA functionalities where an SCC may be established for an unlicensed band and certain of the exemplary embodiments may be used with such a network, e.g. when Licensed Assisted Access (LAA) functionality is configured. In addition, NR-U may be used as a standalone functionality for connecting to an unlicensed bandwidth, independent from any CA functionality. Thus, the exemplary embodiments described below may also be used in for a CA configuration or in the absence of a CA configuration.

CA functionality includes a primary component carrier (PCC) and at least one secondary component carrier (SCC) that correspond to the same radio access technology (RAT) being used to facilitate communication with the network. In addition, in 5G NR, EUTRA NR Dual Connectivity (ENDC) may be enabled where a connection is established with both the 5G NR RAT and the LTE RAT, and the exemplary embodiments may be used when ENDC is enabled. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

In NR-U, various unlicensed bands may be deployed for a network connection. NR-U may use multiple different bands including 2.4 GHZ, 5 GHZ, 6 GHZ and 60 GHZ unlicensed bands as well as 3.5 GHZ and 37 GHz shared access bands. In particular, the 60 Hz unlicensed band may be an attractive option for NR-U because it is not currently very crowded and can offer a large amount of contiguous bandwidth. NR-U may be deployed in carrier aggregation, dual connectivity and standalone operation. As mentioned above, the exemplary embodiments may be described relative to carrier aggregation and dual connectivity situations where a single UE has simultaneous connection to multiple cells, however, the exemplary embodiments are applicable to standalone NR-U operation as well.

Figure 4:
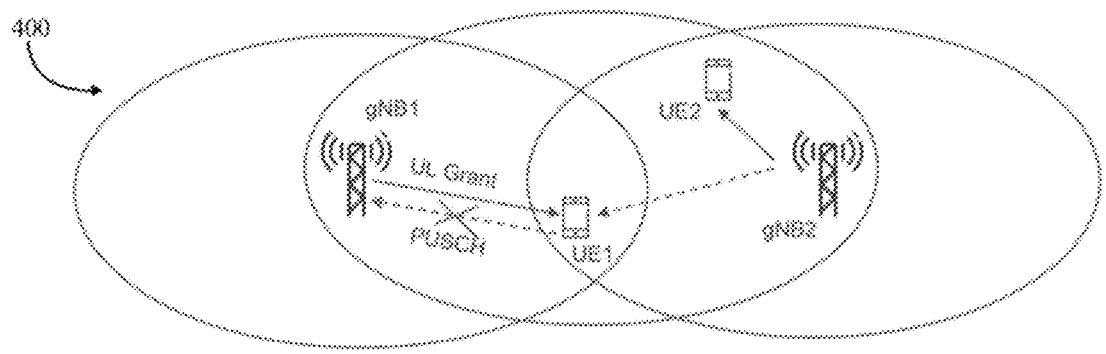
FIG. 4 shows a network arrangement in which a UE is located within sensing range of two respective network cells and the network cells are not within sensing range of each other.

FIG. 4 shows a network arrangement in which a UE is located within sensing range of two respective network cells and the network cells are not within sensing range of each other. As shown, a first cell, e.g. gNB1 and a second cell, e.g. gNB2, are close enough together to provide respective services to a single UE, e.g., UE1, but far enough away that the cells cannot sense one other due to each being located outside of the sensing range of the other. In this scenario, complications may occur when the gNB1 senses a given unlicensed channel to be clear, but the UE1 senses the channel to be busy because the gNB2 that is also within its range is providing services to one or more other UEs, e.g., UE2, on the same unlicensed channel that is sensed to be clear by the gNB1.

Before transmitting a UL grant to the UE1 on a given channel, the gNB1 senses the channel to be idle (e.g. available) by using a listen-before-talk (LBT) procedure, e.g. an LBT category 4 procedure. However, unknown to the gNB1, the gNB2 is using the channel for a connection to the UE2 outside the range of the gNB1. After receiving the UL grant from the gNB1, the UE1 may sense the channel to be busy by using an LBT procedure, e.g. a 25 us one-shot LBT, and sensing the connection between the gNB2 and the UE2. Thus, the UE1 does not perform a UL transmission to the gNB1 and the scheduled UL resources are wasted, which may degrade the UL performance and result in inefficient spectrum utilization.

The exemplary embodiments relate to a network cell triggering a UE to conduct measurements on a set of unlicensed resources and report the measurement results to the gNB to assist in subsequent PUSCH scheduling for the UE. The network may additionally trigger a group of UEs to conduct respective measurements on different unlicensed resources.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 122 and/or the LTE-RAN 120.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs. Specifically, the UEs 110, 112 may simultaneously connect to and exchange data with a plurality of gNBs 120A, 120B in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B. The UE 110 connection to gNB 120A may be, for example, an NR-U connection, via which the gNB 120A may signal the UE 110 to conduct measurements on unlicensed bandwidths for subsequent PUSCH scheduling. The UE 112 connection to gNB 120B may also be an NR-U connection utilizing an unlicensed bandwidth. When the UE 110 is within range of the gnB 120B, the UE 110 may sense the use of the unlicensed spectrum between the UE 112 and the gNB 120B, as described above with respect to FIG. 4.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
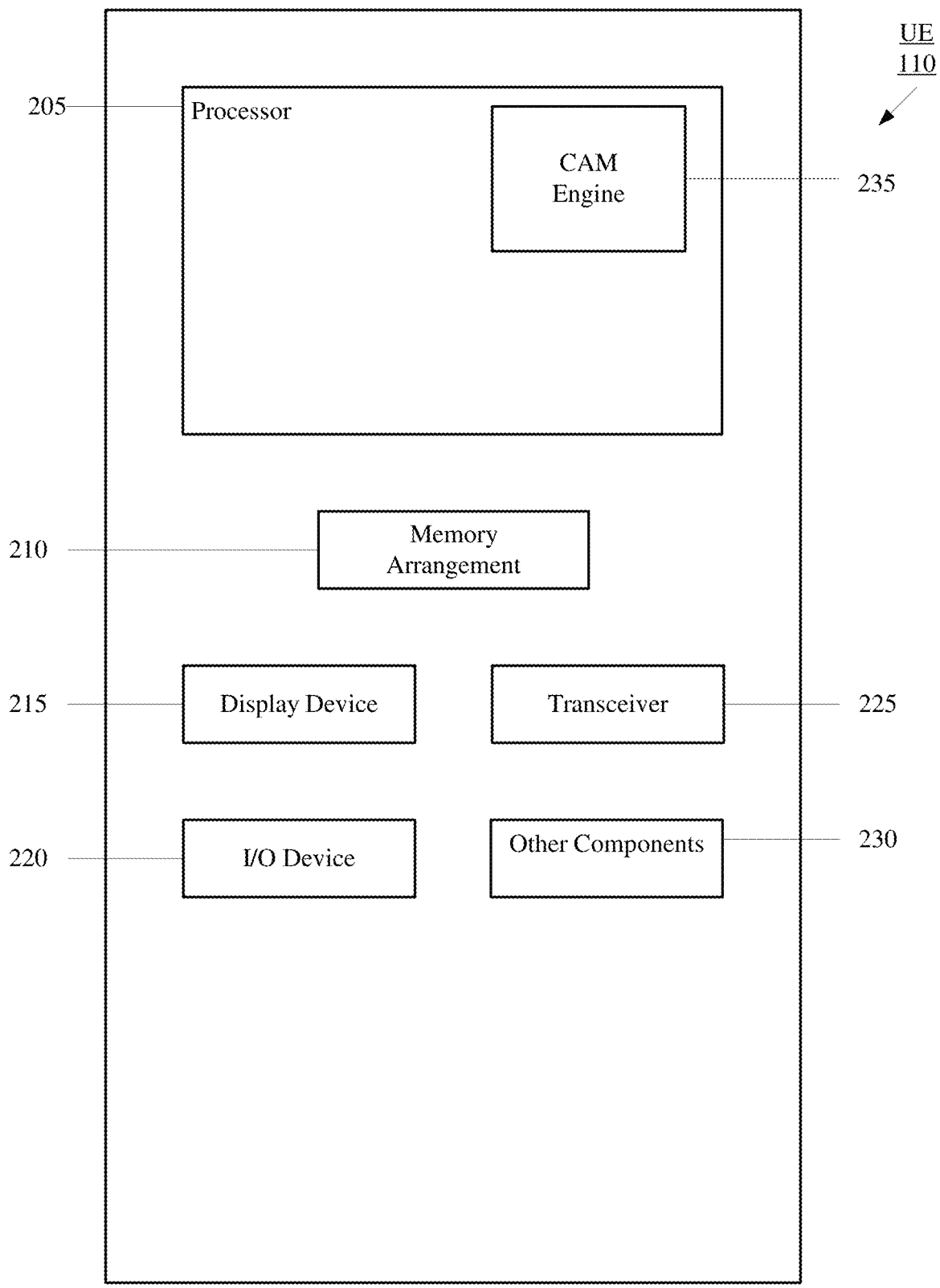
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a CAM engine 235. The CAM engine 235 may perform operations including initiating channel access measurements on an unlicensed bandwidth and reporting the results to the network.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Using the CA functionality, the gNB 120A may serve as the PCell while the gNB 120B may serve as at least one of the SCells. The SCells may also be, for example, small cells. However, the exemplary embodiments will be described relative to a UE establishing a connection with a single network cell and being within sensing range of another network cell that may not be employed in a CA configuration with the UE. Although the UE may be configured with a CA functionality, the exemplary embodiments are applicable to a standalone NR-U scenario as well, where only a single network cell is providing unlicensed band connectivity for the UE and the second network cell is providing unlicensed band connectivity for a second UE and not the first UE.

Figure 3:
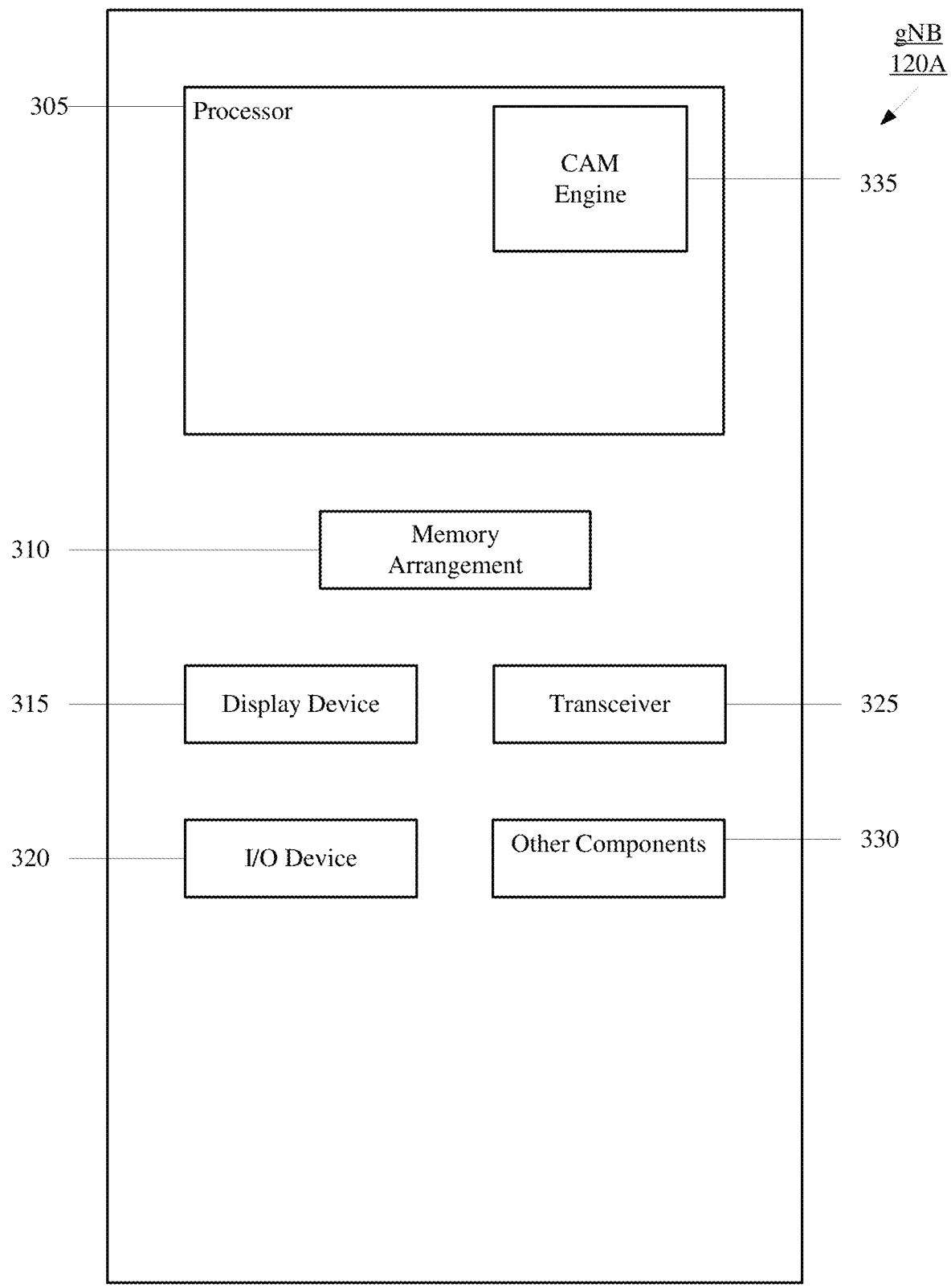
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a CAM engine 335. The CAM engine 335 may perform operations including DCI configuration and transmission to a UE to trigger the UE to conduct measurements on an unlicensed bandwidth.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). When serving as the PCell, the transceiver 325 may operate on licensed channels/bandwidths to communicate with the corresponding UE as a PCC and may additionally operate on an unlicensed bandwidth to communicate with the corresponding UE as an SCC. When serving as the SCell, the transceiver 225 may operate on licensed channels/bandwidths to communicate with the corresponding UE via a conventional CA functionality or unlicensed bandwidths to communicate with the corresponding UE via NR-U functionality. Therefore, the transceiver 325 may include one or more components (e.g., radios) to enable the data exchange with the various networks and UEs.

Figure 5:
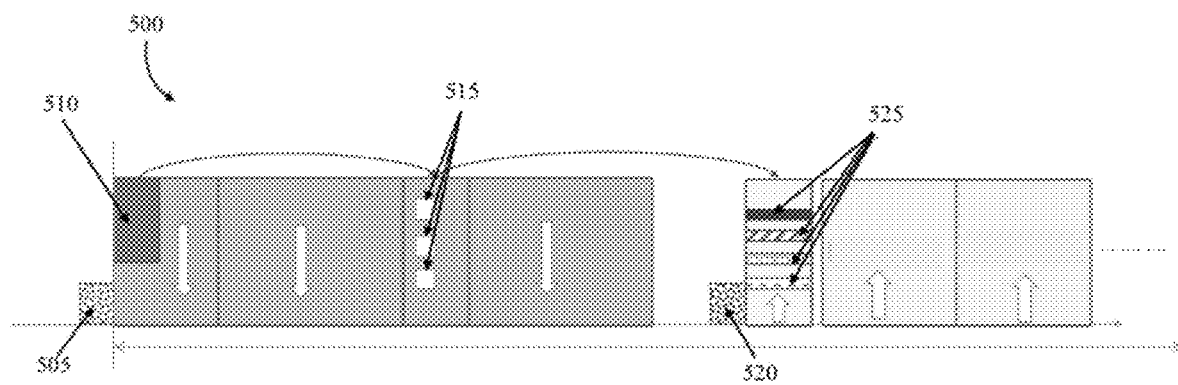
FIG. 5 shows a signaling diagram for a UE and a network cell for determining a channel status for one or more unlicensed channels.
Figure 6:
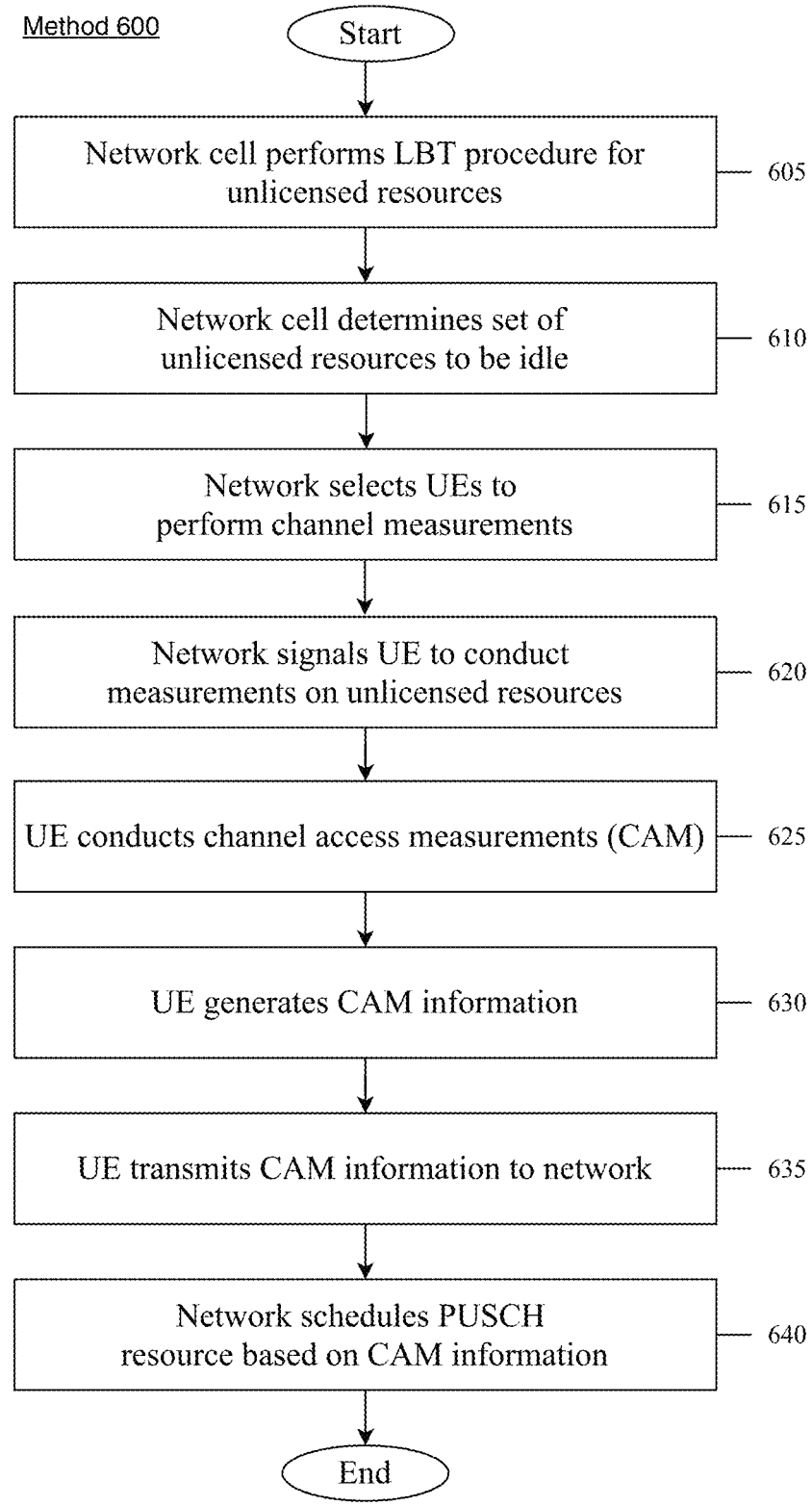
FIG. 6 shows a method for determining a channel status for one or more unlicensed channels according to various exemplary embodiments of the present disclosure.

FIG. 5 shows a signaling diagram 500 for a UE and a network cell for determining a channel status for one or more unlicensed channels. The channel status may comprise either one of "idle" or "busy." The signaling diagram 500 will be described relative to FIG. 6. FIG. 6 shows a method 600 for determining a channel status for one or more unlicensed channels according to various exemplary embodiments of the present disclosure. As will be described in further detail below, the signaling diagram 500 includes an LBT 505 initiated by a network cell, a triggering signal 510 sent from the network cell on the DL to one or more UEs indicating information including a resource to conduct measurements on, a channel access measurement (CAM) resource 515 for performing channel measurements at the UE, a CAM measurement signal 520 sent to the network to transmit the results of the measurements, and a measurement report 525 transmitted to the network cell from the UE on the UL, e.g. the PUCCH.

In 605, a network cell, e.g. gNB 120A, performs a listen before talk (LBT) procedure, e.g. a Cat 4 LBT, for a plurality of unlicensed bands to determine whether the resources are idle or busy. In 510, the network cell determines a set of one or more bands of the plurality of unlicensed bands to be idle, e.g., being available for connection thereto by a UE, e.g. UE 110, within range of the network cell. Other ones of the plurality of unlicensed bands may be determined to be busy, e.g. being unavailable for connection thereto due to the resources being used for connections with other devices. The successful LBT for the set of resources is shown in the signaling diagram 500 as LBT 505.

In 615, the network cell selects one or more UEs to perform channel measurements. For example, each of the UEs may be selected based on a respective UE-specific buffer status and/or based on a possibility for the respective UEs to be scheduled for future transmissions. The following processes are described relative to a single selected UE, however, it is noted that the process may be implemented at each of the selected UEs. The signaling described below may be configured separately for different UEs, e.g. directing different UEs to measure different unlicensed bandwidths, or may be configured similarly for all the UEs or for multiple UEs in a group.

In 620, the network cell signals the UE to trigger the UE to access one or all of the resources (unlicensed bands) where LBT succeeded and conduct measurements on the set of resources. The signaling may be transmitted to the UE at the outset of a downlink transmission with the UE.

The triggering signal 510, as shown in the signaling diagram 500, may be a DCI, e.g. a DCI format X. The DCI comprises a set of information fields with each indicating one resource block to be measured, ie. block number 1, block number 2, . . . , block number M. Each information field may comprise a 1 bit Channel Access Request information element (IE) and a 2 bit transmit power control (TPC) IE. In some embodiments, the starting position of a block may be determined by a parameter startingBitOfFormatX provided by higher layers for the UE configured with the block. In other embodiments, assuming an equal size for each block, the UE may be configured with an index to the block for the given UE, e.g., different UEs may be configured with different indices.

In some embodiments, a bit of value zero may be appended to the DCI format X to align with other DCI formats and avoid increasing blind decoding attempts. In other embodiments, a dedicated radio network temporary identifier (RNTI) may be used to differentiate the DCI format X with other size-aligned DCI formats.

In 625, the UE conducts channel access measurement (CAM) on a CAM resource, the measurements including either one or both of energy detection measurements and signal strength measurements, as shown in 515 of the signaling diagram 500, for the resources indicated to the UE in the triggering signal. According to various exemplary embodiments of the present disclosure, different resources may be triggered to perform the measurements, as described below.

Figure 7:
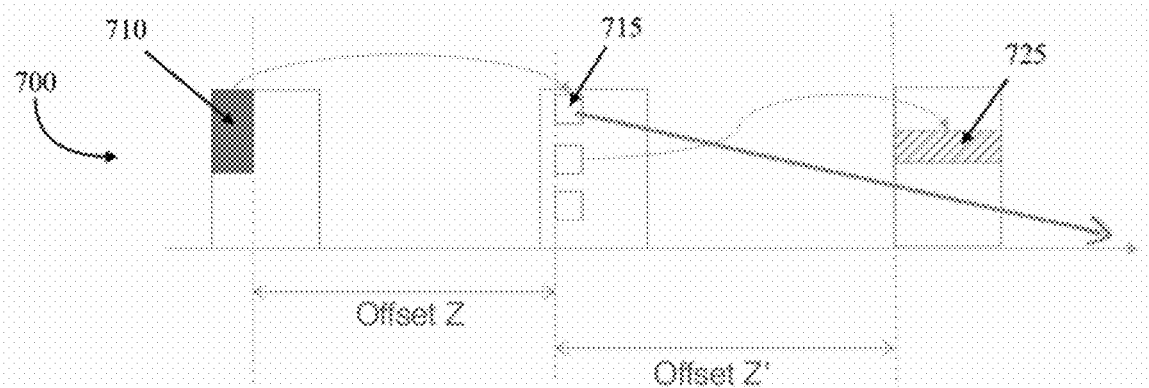
FIG. 7 shows a signaling diagram comprising a CSI-IM resource for conducting CAM operations according to a first embodiment of the method of FIG. 6.

In some exemplary embodiments, a CSI interference measurement (CSI-IM) resource may be used for the UE to conduct CAM operations. As shown in the signaling diagram 700 of FIG. 7, the scheduling offset Z between the last symbol of the triggering signal 710 and the first signal of the aperiodic CSI-IM resource 715, e.g. a zero power channel state information reference signal (ZP-CSI-RS), is configured by RRC signaling from a set of hard-encoded values in specification, subject to the corresponding capability reported by the UE. The scheduling offset Z' between the first symbol of the CSI-IM resource 715 and the first symbol of the UL channel carrying the CAM report 725 may be provided by the triggering signal 710, e.g. using K1 values or K2 values depending on which channel is used. The density of the CSI-IM may be fixed in specification and be e.g. one resource element (RE) per PRB or 3 REs per PRB.

Figure 8:
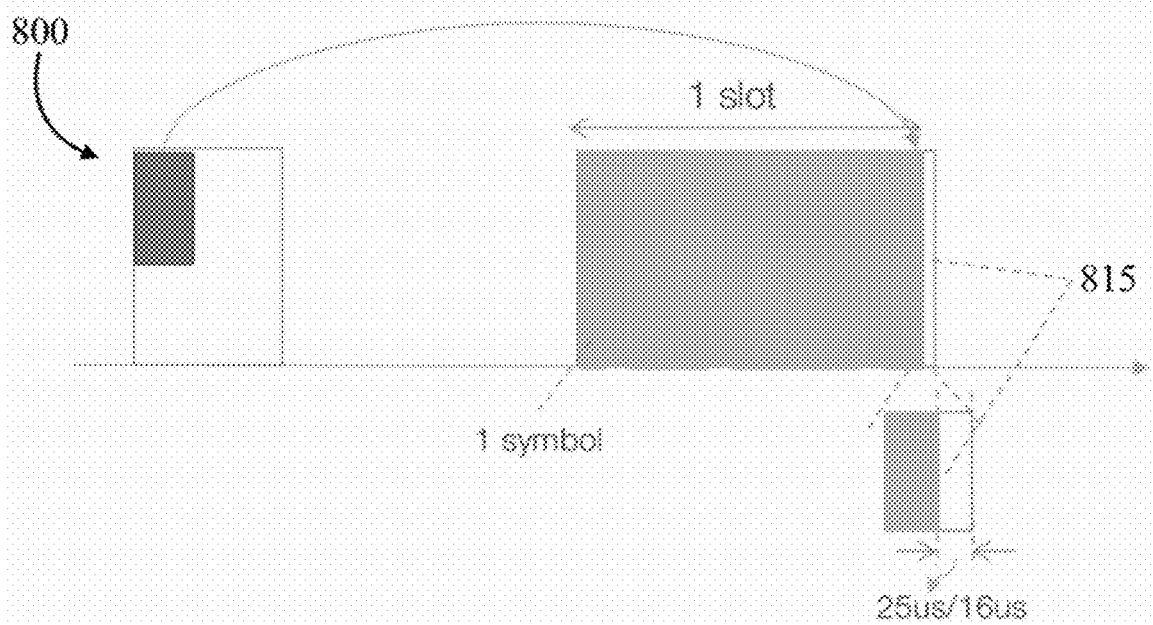
FIG. 8 shows a signaling diagram comprising a punctured DL resource for conducting CAM operations according to a second embodiment of the method of FIG. 6.

In another exemplary embodiment, one or more symbols in the DL transmission may be punctured or rate-matched to provide a gap of a specific duration for CAM purposes. FIG. 8 shows a signaling diagram 800 where the CAM resource 815 is provided as a gap of, for example, 16 μs or 25 μs created by shortening the DL transmission. The number of punctured symbols S may depend on the subcarrier spacing (SC). For example, an SCS of 15 kHz or 30 kHz may correspond to one shortened symbol, while an SCS of 60 kHz may correspond to two shortened symbols. Similar to the first embodiment discussed above, the offsets Z and Z' may be hard-encoded in specification and provided in the DCI format X discussed above.

In 630, the UE generates CAM information for the resources triggered by the DCI in the following ways.

In some embodiments, the UE determines an energy parameter for the channel and compares it to a predetermined energy detection threshold. The UE may be configured with a higher level parameter EnergyDetection Threshold $X_{thresh}$ by the network cell. In other embodiments, a default value defined by regulatory requirements may be used for $X_{thresh}$ if it is not configured by the network cell. In still other exemplary embodiments, the value of $X_{thresh}$ may be determined by the maximum transmission power and transmission bandwidth for the channel. The UE may perform energy measurements and compares the measured energy Y to the energy detection threshold. If $Y<X_{thresh}$, the UE generates one bit of information $O_o^{CAM}=1$ for transmission on the determined PUCCH resource $n_o^{CAM}$, to be explained in further detail below. Otherwise, e.g. if $Y>X_{thresh}$, the UE may feedback nothing to the network cell for this triggering (e.g. discontinuous transmission (DTX)), and thus, in this scenario, the method ends.

In other exemplary embodiments, the UE measures a signal strength, e.g. an L1 receiver signal strength indicator (L1-RSSI) to determine a link quality for the channel. A table may be predefined to break down the potential RSSI values into a certain number of ranges, each range having a corresponding number. The measured RSSI value may then be related to the table values and a number of bits determined for signaling the index of the table to the network cell.

In 635, the UE transmits the CAM information generated for the resources triggered by the DCI. The CAM result information may be carried over the PUCCH resource CAM According to some embodiments, as noted above, when the measured energy Y is less than the energy detection threshold $X_{thresh}$, the UE generates one bit of information $O_o^{CAM}=1$ and, in 635, transmits the modulated symbol on the determined PUCCH resource $n_o^{CAM}$. If the measured energy exceeds the threshold, the UE does not transmit anything.

A PUCCH format 0 or PUCCH format 1 may be used to carry the 1-bit CAM information to minimize the UL control signaling overhead. Specifically, the PUCCH format may be configured through UE_dedicated RRC signaling on a per UE basis, based on e.g. the UE UL SINR geometry.

Different methods may be used for CAM PUCCH resource mapping. In one embodiment, the CAM PUCCH resource may be configured by higher layers for each UE. In another embodiment, the UE may be configured with a set of PUCCH format 0 or PUCCH format 1 resources. One PUCCH Resource Indication (PRI) field may be included in the DCI transmitted by the network cell to instruct the UE to select one from the configured set of PUCCH resources.

According to other embodiments, when the UE generates RSSI measurements for the resources, the measured RSSI value may be related to the table values discussed above and a number of bits determined for signaling the index of the table to the network cell and carrying the number by the PUCCH resource.

In 640, the network uses the measurement report to determine whether to schedule a PUSCH resource for the UE. If a PUSCH is determined to be scheduled for the UE, a second DCI format may be used to provide resource allocation.

According to other exemplary embodiments of the present disclosure, a two-step UL grant may be used for scheduling PUSCH transmission of measurement results.

Figure 9:
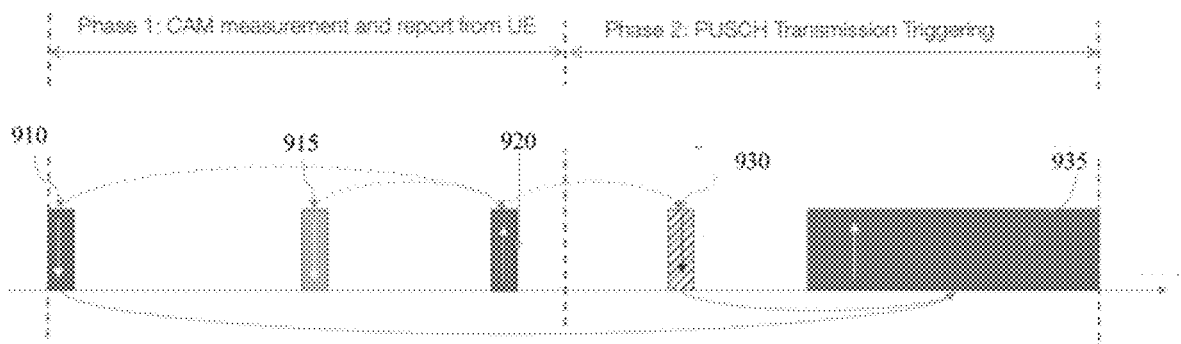
FIG. 9 shows a signaling diagram for a UE and a network cell for determining a channel status for an unlicensed resource and scheduling a PUSCH resource using a two-phase uplink (UL) grant.
Figure 10:
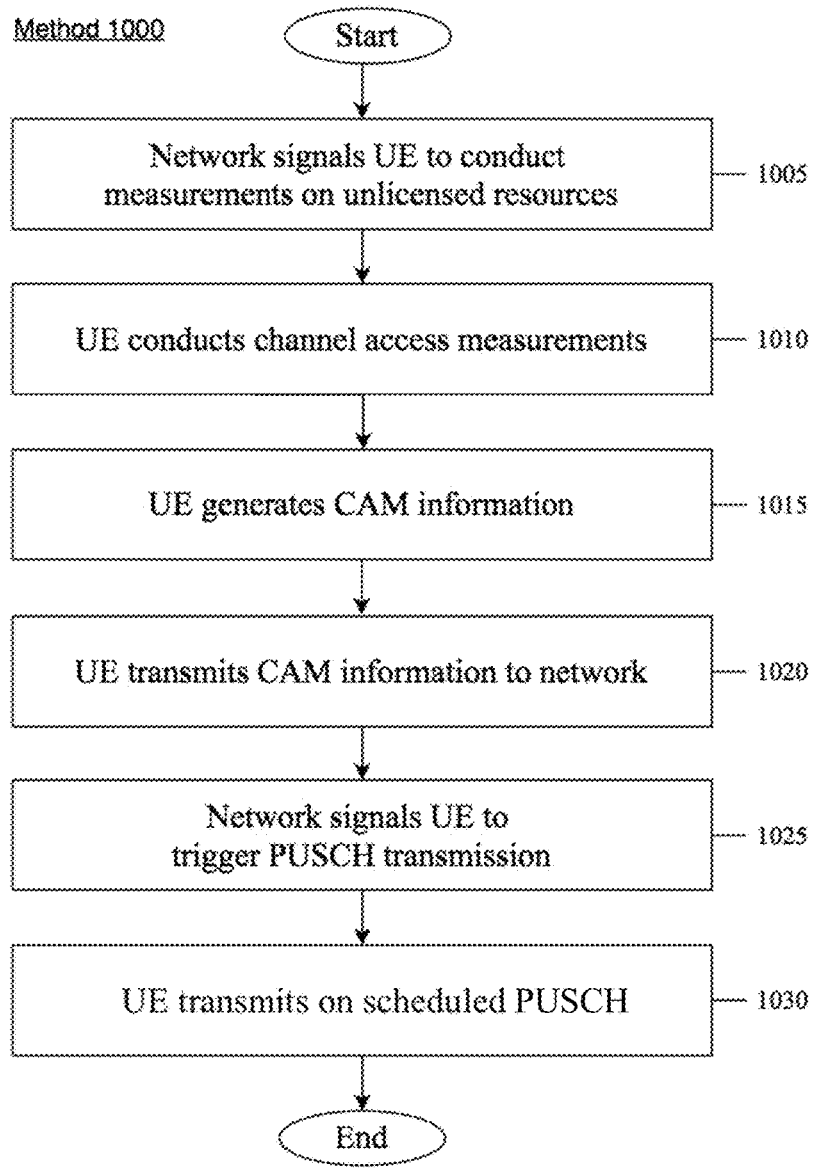
FIG. 10 shows a method for determining a channel status for an unlicensed resource and scheduling a PUSCH resource using a two-phase uplink (UL) grant according to various exemplary embodiments of the present disclosure.

FIG. 9 shows a signaling diagram 900 for a UE and a network cell for determining a channel status for an unlicensed resource and scheduling a PUSCH resource using a two-phase uplink (UL) grant, e.g. a first, earlier DCI and a second, later DCI. The signaling diagram 900 will be described relative to FIG. 10. FIG. 10 shows a method 1000 for determining a channel status for an unlicensed resource and scheduling a PUSCH resource using a two-phase uplink (UL) grant according to various exemplary embodiments of the present disclosure. As will be described in further detail below, the signaling diagram 900 includes two phases of UL grants (DCIs) 910, 930, wherein the UE will transmit on the PUSCH only after the second, triggering DCI is received.

In 1005, a network cell, e.g. gNB 120A signals the UE to conduct measurements on an unlicensed resource. The triggering signal 910, as shown in the signaling diagram 900, may be a UL grant DCI format modified to trigger the CAM measurement 915 and CAM report 920. In one embodiment, a Channel Access Request field may be added to scheduling DCI format 0_0 or 0_1 to trigger the channel access measurement resource 915 and the CAM report 920 over the PUCCH 925.

In 1010, the channel access measurement resource is used to conduct measurements on the unlicensed resource indicated in the DCI. The measurements may be conducted in a manner substantially similar to that discussed above with respect to step 625 of the method 600. For example, a CSI-IM resource may be used to conduct the CAM operations, as discussed above.

In 1015, the UE generates CAM information for submission to the network. The CAM information may be generated in a manner substantially similar to that discussed above with respect to step 630 of the method 600. For example, the UE measures an energy parameter and/or an RSSI for the unlicensed channel.

In 1020, the UE transmits the CAM information on the PUCCH. The CAM information may be transmitted in a manner substantially similar to that discussed above with respect to step 635 of the method 600.

The UE, in this method, is configured to perform a PUSCH transmission only if it detects both the first DCI format 910 and a second DCI format 930. In the absence of the second DCI 930, the UE will not conduct UL transmission even if it was scheduled by the earlier first DCI 910.

In 1025, the network cell signals the UE to trigger PUSCH transmission. The second triggering signal 930 may use a DCI similar to the DCI 910, but comprising a PUSCH transmission triggering field set to "1."

In some embodiments, the downlink control information may be split into two parts and carried over different DCI formats 910, 930. In the first DCI format 910, information may be included related to transport block preparation, such as a time-domain resource allocation (TDRA), a frequency domain resource allocation (FDRA), an MCS, a HARQ process, a channel access request, a PUCCH resource indicator (PRI), and an aggregation level of associated DCI format 930. In the second DCI 930, there may be a 1-bit UL transmission trigger and, in some embodiments, the DCI 930 may be targeted to one or more UEs. For example, each UE may be configured with an index by higher layers to determine the field associated with it in the DCI 930.

A dedicated RNTI may be used to differentiate the DCI 930 from the other size-aligned DCI formats. The timing between the first scheduling DCI 910 and the second triggering DCI 930 may be configured as part of UE capability.

In 1030, the UE transmits on the scheduled PUSCH based on the triggering signal 930.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A non-transitory computer readable storage medium comprising a set of instructions, wherein the set of instructions when executed by a processor of a next generation Node B (gNB) configured to provide an unlicensed bandwidth for communications with a user equipment (UE) cause the processor to perform operations, comprising:
    performing a listen-before-talk procedure to determine an occupation state of busy or idle for the unlicensed bandwidth;
    when the occupation state is determined by the gNB to be idle, signaling the UE, via a first downlink control indicator (DCI), to conduct a channel access measurement (CAM) on the unlicensed bandwidth, the measurement comprising at least one of an energy detection measurement or a signal quality measurement;
    receiving, from the UE, a measurement report comprising an indication of the occupation state of the unlicensed bandwidth as determined by the UE; and
    signaling the UE, via a second DCI to transmit on a physical uplink shared channel (PUSCH), wherein the first DCI provides a first set of information for a first PUSCH transmission including time-domain resource allocation (TDRA), a frequency domain resource allocation (FDRA), an MCS, a HARQ process, a channel access request and a PUCCH resource indicator (PRI) and the second DCI includes a 1-bit UL transmission trigger field to trigger the PUSCH transmission.

2. The non-transitory computer readable storage medium of claim 1, wherein the operations further comprise:
    scheduling a PUSCH resource for the UE based on the measurement report.

3. The non-transitory computer readable storage medium of claim 1, wherein the first DCI comprises a set of fields, each field indicating certain resource blocks to be measured by the UE.

4. The non-transitory computer readable storage medium of claim 1, wherein the operations further comprise:
    determining a CAM resource for the UE to conduct CAM operations.

5. The non-transitory computer readable storage medium of claim 4, wherein the CAM resource comprises a CSI interference measurement (CSI-IM) resource.

6. The non-transitory computer readable storage medium of claim 4, wherein the CAM resource comprises one or more punctured downlink symbols.

7. The non-transitory computer readable storage medium of claim 1, wherein the UE compares the energy detection measurement to a predetermined threshold, the operations further comprising:
    determining the unlicensed bandwidth is idle based on an indication in the measurement report that the energy detection measurement is less than the predetermined threshold.

8. The non-transitory computer readable storage medium of claim 1, wherein the signal quality measurement comprises a received signal strength indicator (RSSI) measurement, the operations further comprising:
    determining the occupation status of the unlicensed bandwidth based on an indication in the measurement report of the RSSI measurement.

9. A non-transitory computer readable storage medium comprising a set of instructions, wherein the set of instructions when executed by a processor of a user equipment (UE) in communication with a next generation evolved Node B (gNB) configured to provide an unlicensed bandwidth for communications with the UE cause the processor to perform operations, comprising:
    receiving a signal from the gNB, via a downlink control indicator (DCI), to conduct a channel access measurement (CAM) on the unlicensed bandwidth, the measurement comprising at least one of an energy detection measurement or a signal quality measurement;
    conducting the measurement on the unlicensed bandwidth;
    collecting received signal strength indicator (RSSI) measurement data indicating a signal quality associated with the unlicensed bandwidth;
    generating, for transmission to the gNB, CAM information comprising an indication of the RSSI measurement data using a number of bits, wherein the number of bits used to indicate the RSSI measurement data is determined based on a predefined table;
    generating, for transmission to the gNB, a measurement report comprising an indication of an occupation state of the unlicensed bandwidth as determined by the UE.

10. The non-transitory computer readable storage medium of claim 9, wherein the first DCI comprises a set of fields, each field indicating certain resource blocks to be measured by the UE.

11. The non-transitory computer readable storage medium of claim 10, wherein the measurement is conducted via a CAM resource indicated in the DCI.

12. The non-transitory computer readable storage medium of claim 11, wherein the CAM resource comprises a CSI interference measurement (CSI-IM) resource.

13. The non-transitory computer readable storage medium of claim 11, wherein the CAM resource comprises one or more punctured downlink symbols.

14. The non-transitory computer readable storage medium of claim 9, wherein the operations further comprise:
    comparing the energy detection measurement to a predetermined threshold; and
    indicating in the measurement report that the energy detection measurement is less than the predetermined threshold.

15. The non-transitory computer readable storage medium of claim 9, wherein the operations further comprising:
    indicating the RSSI measurement in the measurement report.

16. A non-transitory computer readable storage medium comprising a set of instructions, wherein the set of instructions when executed by a processor cause the processor to perform operations, comprising:
    at a user equipment (UE) in communication with a next generation Node B (gNB) configured to provide an unlicensed bandwidth for communications with the user equipment (UE):
        receiving a first signal from the gNB, via a first downlink control indicator (DCI), to conduct a channel access measurement (CAM) on the unlicensed bandwidth, the measurement comprising at least one of an energy detection measurement or a signal quality measurement;
        conducting the measurement on the unlicensed bandwidth;
        transmitting, to the gNB, a measurement report comprising an indication of an occupation state of the unlicensed bandwidth as determined by the UE; and
        receiving a second signal from the gNB, via a second DCI, to transmit on a physical uplink shared channel (PUSCH), wherein the first DCI provides a first set of information for a first PUSCH transmission including time-domain resource allocation (TDRA), a frequency domain resource allocation (FDRA), an MCS, a HARQ process, a channel access request and a PUCCH resource indicator (PRI) and the second DCI includes a 1-bit UL transmission trigger field to trigger the PUSCH transmission.

17. The non-transitory computer readable storage medium of claim 16, wherein the first DCI provides aggregation level information for monitoring the second DCI in a subsequent occasion of PDCCH monitoring.

18. The non-transitory computer readable storage medium of claim 16, wherein the second DCI addresses one or more UEs, each UE being configured with a field index provided by higher layer to determine the field associated for the respective UE.

* * * * *